United States Patent
Higashika et al.

(10) Patent No.: US 9,539,792 B2
(45) Date of Patent: Jan. 10, 2017

(54) VULCANIZATION-ADHERED LAMINATE OF FLUORORUBBER AND SYNTHETIC RUBBER

(75) Inventors: Shinji Higashika, Himeji (JP); Takaaki Nomura, Himeji (JP); Keizo Saga, Himeji (JP); Shin-ichiro Goto, Himeji (JP)

(73) Assignee: NICHIRIN CO., LTD., Kobe (JP)

( * ) Notice: Subject to any disclaimer, the term of this patent is extended or adjusted under 35 U.S.C. 154(b) by 98 days.

(21) Appl. No.: 13/635,290

(22) PCT Filed: Mar. 22, 2011

(86) PCT No.: PCT/JP2011/056807
§ 371 (c)(1),
(2), (4) Date: Dec. 10, 2012

(87) PCT Pub. No.: WO2011/118569
PCT Pub. Date: Sep. 29, 2011

(65) Prior Publication Data
US 2013/0078472 A1 Mar. 28, 2013

(30) Foreign Application Priority Data

Mar. 24, 2010 (JP) ................................ 2010-068646

(51) Int. Cl.
*B32B 25/04* (2006.01)
*F16L 11/04* (2006.01)
*F16L 11/08* (2006.01)

(52) U.S. Cl.
CPC ............ *B32B 25/042* (2013.01); *B32B 25/04* (2013.01); *F16L 11/04* (2013.01); *F16L 11/086* (2013.01); *Y10T 428/3154* (2015.04)

(58) Field of Classification Search
None
See application file for complete search history.

(56) References Cited

U.S. PATENT DOCUMENTS 5,300,569 A * 4/1994 Drake et al. .................... 525/78
5,855,976 A * 1/1999 Oyama et al. ............... 428/36.6
(Continued)

FOREIGN PATENT DOCUMENTS

| EP | 0 759 354 A1 | 2/1997 |
|---|---|---|
| JP | 04-338533 A | 11/1992 |

(Continued)

OTHER PUBLICATIONS

International Search Report mailed by Japan Patent Office on Jun. 21, 2011 in the corresponding PCT application No. PCT/JP2011/056807.

(Continued)

*Primary Examiner* — Callie Shosho
*Assistant Examiner* — Patrick English
(74) *Attorney, Agent, or Firm* — Knobbe, Martens, Olson & Bear LLP

(57) ABSTRACT

A vulcanization-adhered laminate is constituted by a structure where a fluororubber layer and a synthetic rubber-containing layer are tightly adhered by vulcanization by vulcanization, and the synthetic rubber layer prior to the vulcanization-adhesion includes organic peroxide, silica, organic phosphonium salt, maleic anhydride-modified polybutadiene, and magnesium oxide.

4 Claims, 1 Drawing Sheet

(56) References Cited

U.S. PATENT DOCUMENTS

| | | | |
|---|---|---|---|
| 6,057,014 A * | 5/2000 | Fuller | 428/35.7 |
| 6,416,834 B1 | 7/2002 | Fuller | |
| 6,576,311 B2 | 6/2003 | Noguchi et al. | |
| 2003/0087053 A1 * | 5/2003 | Fukushi | B32B 1/08 |
| | | | 428/36.91 |

FOREIGN PATENT DOCUMENTS

| | | | |
|---|---|---|---|
| JP | 08-157646 A | 6/1996 |
| JP | 11-315966 A | 11/1999 |
| JP | 2001-205745 A | 7/2001 |
| JP | 2005-315415 A | 11/2005 |
| WO | WO 95/19880 A1 | 7/1995 |
| WO | WO 98/36901 A1 | 8/1998 |

OTHER PUBLICATIONS

The First Office Action mailed by the State Intellectual Property Office of People's Republic of China in the corresponding Chinese patent application No. 201180015183.9—6 pages.

The extended European search report issued by the European Patent Office on May 8, 2014 in the corresponding European patent application No. 11759374.9—5 pages.

* cited by examiner

US 9,539,792 B2

VULCANIZATION-ADHERED LAMINATE OF FLUORORUBBER AND SYNTHETIC RUBBER

This application is the U.S. National Phase under 35 U.S.C. §371 of International Application PCT/JP2011/056807, filed Mar. 22, 2011, which claims priority to Japanese Patent Application No. 2010-068646, filed Mar. 24, 2010. The International Application was published under PCT Article 21(2) in a language other than English.

TECHNICAL FIELD

The present invention relates to a vulcanization-adhered laminate of fluororubber and synthetic rubber, which is not fluororubber, such as NBR, hydrogenated NBR, NBR/PVC blend, NBR/EPDM blend, CSM, ECO, ACM, AEM CR or the like.

BACKGROUND ART

Fluororubber is drawing the attention as a material for fuel hoses, etc., due to its excellent heat resistance, oil resistance, ozone resistance, chemical resistance, and the like, but the high cost of fluororubber presents a problem.

For this reason, a double-layer structure comprising an innermost layer made of fluororubber to maintain oil resistance as well as flexibility of the hose, and an outer layer made of synthetic rubber, is considered optimal. Among various double-layer structures, one using NBR (acrylonitrile butadiene rubber), rubber that offers relatively favorable oil resistance and is also affordable, is considered the best. However, in general, adhering fluororubber and synthetic rubber directly by means of vulcanization has been difficult.

Accordingly, Patent Literature 1, for example, proposes a rubber laminate of fluororubber and NBR characterized in that 0.3 to 5 parts by weight of at least one chemical compound selected from a group that includes 1,8-diazabicyclo (5,4,0) undecene-7 (DBU), 1,5-diazabicyclo (4,3,0) nonene-5 (DBN) and salts thereof, 0.5 to 30 parts by weight of at least one alkali substance selected from a group that includes calcium hydroxide, sodium carbonate, potassium carbonate, sodium meta-silicic acid and calcium oxide, 1 to 7 parts by weight of organic sulfur donor, and 0 to 0.5 parts by weight of sulfur, are contained per 100 parts by weight of NBR. Because DBU, DBN, DBU salt or DBN salt is used, however, scorching tends to occur when the synthetic rubber blend is kneaded, stored and formed into a laminate even when anti-scorching agent, etc., is added with the aim of preventing scorching. For this reason, any fundamental scorching prevention measure requires that DBU, DBN, etc., not be used. Nevertheless, vulcanization adhesion becomes difficult if DBU, DBN, etc., is not used.

Additionally, Patent Literature 2 present vulcanization adhesion of fluororubber and NBR/PVC, while Patent Literature 3 presents vulcanization adhesion of fluororubber and NBR/EPDM, where, in both cases, vulcanization adhesion involves fluororubber and a rubber composition consisting of not only NBR, but also with PVC or EPDM blended and DBU salt compounded further.

Patent Literature 4 describes that by using a fluororubber layer which contains specific fluororubber and specific acrylic rubber and comprises a layer constituted by a composition which permits peroxide co-crosslinking, a laminate offering excellent adhesion with a layer constituted by other rubber can be obtained.

Under vulcanization adhesion described in any one of Patent Literatures 1 to 3 above, however, use of DBU, DBN, etc., makes it necessary to still implement scorching prevention means. Otherwise, the only way to improve adhesion is to make the fluororubber layer from a composition combining limited ingredients in order to improve adhesion property, as described in Patent Literature 4.

There have been calls for specifically ascertaining a vulcanization adhesion formula of fluororubber and synthetic rubber, to provide a vulcanization-adhered laminate that takes advantage of this formula to firmly adhere fluororubber and synthetic rubber by means of vulcanization without adopting any anti-scorching means necessitated by use of DBU, DBN, etc.

BACKGROUND ART LITERATURES

Patent Literatures

Patent Literature 1: Japanese Patent Laid-open No. Hei 4-338533
Patent Literature 2: Japanese Patent Laid-open No. Hei 11-315966
Patent Literature 3: Japanese Patent Laid-open No. 2001-205745
Patent Literature 4: International Patent Application Publication No. 1998/036901

SUMMARY OF THE INVENTION

Problems to be Solved by the Invention

Specifically ascertain a vulcanization adhesion formula of fluororubber and synthetic rubber, to provide a vulcanization-adhered laminate that takes advantage of this formula to firmly adhere fluororubber and synthetic rubber by means of vulcanization without adopting any anti-scorching means necessitated by use of DBU, DBN, etc.

Means for Solving the Problems

A vulcanization-adhered laminate comprising a fluororubber layer (A) which is vulcanization-adhered with a layer constituted by a synthetic rubber which is one type of or a blend of two or more types of rubber that are not fluororubber and selected from group (B) below, wherein the layer constituted by synthetic rubber other than fluororubber contains (1) to (5) below before vulcanization adhesion, as well as a flexible vehicle hose made with said laminate:

(1) Organic peroxide
(2) Silica
(3) Organic phosphonium salt
(4) Maleic anhydride-modified polybutadiene
(5) Magnesium oxide
(B) NBR, hydrogenated NBR, NBR/PVC blend, NBR/EPDM blend, CSM, ECO, ACM, AEM or CR Effects of the Invention The method proposed by the present invention provides a laminate constituted by any one of various types of fluororubber and specific synthetic rubber firmly adhered to each other by means of vulcanization. Applications for this laminate include fuel hoses, etc., that fully utilize the properties of fluororubber.

MODE FOR CARRYING OUT THE INVENTION

Figure 1:
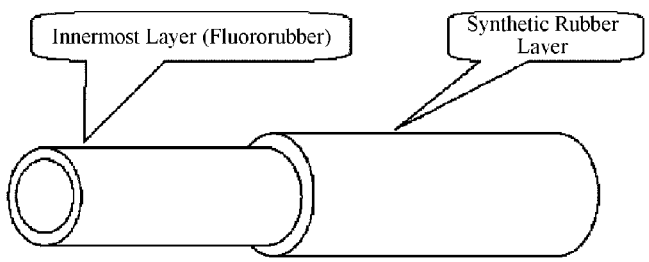
FIG. 1 Hose made of two layers, wherein the inner layer uses fluororubber, while the outer layer uses synthetic rubber.

The present invention is explained in detail below. The present invention is a vulcanization-adhered laminate of fluororubber and specific synthetic rubber, wherein the specific synthetic rubber layer contains peroxide crosslinking agent, silica, organic phosphonium salt, maleic anhydride-modified polybutadiene and magnesium oxide.

[Fluororubber Layer]

Fluororubber to be used is not specifically limited, and any copolymer of fluorine-containing monomers or copolymer of fluorine-containing monomer and hydrocarbon monomer can be used.

Fluorine-containing monomers include: fluoroethylenes such as vinylidene fluoride, trifluoroethylene, trifluorochloroethylene, tetrafluoroethylene, vinyl fluoride and the like; fluoropropylenes such as hexafluoropropene, pentafluoropropene and the like; and perfluoro-(alkylvinylethers) such as perfluoro-(methylvinylether), perfluoro-(propylvinylether) and the like. One type of fluorine monomer may be used on its own or two or more types may be used in combination.

Hydrocarbon monomers include: olefins such as ethylene, propylene and the like; vinylethers such as methylvinylether, ethylvinylether and the like; vinylesters such as vinylacetate and the like; esteracrylates such as methylacrylate and the like. One type of hydrocarbon monomer may be used on its own or two or more types may be used in combination.

Additionally, under the present invention, fluororubber may be a copolymer obtained by copolymerizing a small amount of other monomers providing the location of vulcanization in addition to the aforementioned fluorine monomers and hydrocarbon monomers. Examples of such other monomers include: iodine atom-containing monomers such as 2-iodineperfluoropropene, 4-iodinefluorobutene-1 and the like; and bromineatom-containing monomers such as bromotrifluoroethylene, 4-bromo-3,3,4,4-tetrafluorobutene-1 and the like.

Specific, preferred examples of the fluororubber used in the present invention include vinylidene fluoride-hexafluoropropylene copolymer, vinylidene fluoride-hexafluoropropylene-tetrafluoro ethylene copolymer, tetrafluoroethylene-propylene copolymer and tetrafluoroethylene-vinylidene fluoride-propylene copolymer, and the like. One type of fluororubber may be used on its own or two or more types may be used in combination.

[Synthetic Rubber Layer]

The synthetic rubber used in the present invention is a synthetic rubber other than fluororubber, constituted by one type of or a blend of two or more types of rubber selected from a group that includes NBR, hydrogenated NBR, NBR/PVC blend, NBR/EPDM blend, CSM, ECO, ACM, AEM and CR, wherein NBR is ideal considering the eventual use in fuel-resistant applications and also considering cost, and particularly NBR whose AN content (bonded acrylonitrile content) is 25 to 50 percent by weight is preferred. If the AN content is low, gasoline resistance and oil resistance both drop; if the AN content is high, on the other hand, oil resistance improves but low-temperature characteristics tend to drop.

Blending acrylic rubber or polyvinyl chloride is expected to achieve an excellent balance of gasoline resistance and oil resistance, while blending EPDM is expected to improve ozone resistance.

Under the present invention, other polymer can be blended with synthetic rubber according to the purpose. Examples of such other polymer include: isoprene rubbers such as natural rubber, isoprene rubber and the like; conjugated diene rubber such as butadiene rubber, styrene-butadiene rubber and the like; and non-diene rubbers such as butyl rubber (IIR) and the like.

[Organic Peroxide]

For the organic peroxide, any organic peroxide used for peroxide crosslinking can be used without limitation. Specific examples include benzoylperoxide, dicumylperoxide, 2,5-dimethyl-2,5-di-(t-butylperoxide)hexane, 1,1'-di-(t-butylperoxi)-diisopropylbenzene, n-butyl-4,4-di-(t-butylperoxi)valerate and 1,1-di-(t-butylperoxi)cyclohexane, etc., among which use of dicumylperoxide or 1,1'-di-(t-butylperoxi)-diisopropyplbenzene is preferred.

Organic peroxide is added preferably by 0.5 to 10 parts by weight, or more preferably by 0.8 to 5 parts by weight, relative to 100 parts by weight of synthetic rubber. Adding organic peroxide by less than 0.5 parts by weight does not achieve sufficient vulcanization of rubber, while adding it by more than 10 parts by weight causes rubber to scorch and rubber properties to drop.

[Silica]

Silica is a silicate ($SiO_2$) filler. For this silicate filler, acidic silica, neutral silica or basic silica can be used as desired.

Silica is added preferably by 5 to 35 parts by weight, or more preferably by 10 to 30 parts by weight, relative to 100 parts by weight of synthetic rubber. Adding silica by less than 5 parts by weight does not achieve sufficient vulcanization adhesion property, while adding it by more than 35 parts by weight causes low-temperature characteristics to drop.

[Organic Phosphonium Salt]

For the organic phosphonium salt, quaternary phosphonium salt containing an alkyl group of 1 to 20 in carbon number, quaternary phosphonium salt containing an aromatic substitution group, or the like can be used. Specific examples include tetrabutylphosphonium salt, tetraoctylphosphonium salt, methyltrioctylphosphonium salt, butyltrioctylphosphonium salt, phenyltributylphosphonium salt, benzyltributylphosphonium salt, benzyltricyclohexylphosphonium salt, benzyltrioctylphosphonium salt, butyltriphenylphosphonium salt, octyltriphenylphosphonium salt, benzyltriphenylphosphonium salt, tetraphenylphosphonium salt, and the like. Among those, tetrabutylphosphonium salt is preferred.

Organic phosphonium salt is added preferably by 0.5 to 5 parts by weight, or more preferably by 0.7 to 3 parts by weight, relative to 100 parts by weight of synthetic rubber. Adding organic phosphonium salt by less than 0.5 parts by weight does not achieve sufficient vulcanization adhesion property, while adding it by more than 5 parts by weight may cause rubber to scorch and can also lead to high unit price of rubber material because the blended chemicals are expensive.

[Maleic Anhydride-Modified Polybutadiene]

Maleic anhydride-modified polybutadiene is made by causing molten maleic anhydride and liquid polybutadiene to directly react with each other in order to introduce acid into rubber and, in the present invention, maleic anhydride-modified polybutadiene is used as an internal adhesive component.

Maleic anhydride-modified polybutadiene is added preferably by 1 to 20 parts by weight, or more preferably by 1.5 to 10 parts by weight, relative to 100 parts by weight of synthetic rubber. Adding maleic anhydride-modified polybutadiene by less than 1 part by weight does not achieve sufficient vulcanization adhesion property, while adding it by more than 20 parts by weight tends to cause rubber properties to drop.

[Magnesium Oxide]

Magnesium oxide functions as an acid receiver of hydrogen fluoride that generates when hydrofluoric acid is removed from fluororubber on the surface contacting synthetic rubber, and has the effect of increasing inter-layer adhesion.

Magnesium oxide is added preferably by 3 to 20 parts by weight, or more preferably by 5 to 15 parts by weight, relative to 100 parts by weight of synthetic rubber. Adding magnesium oxide by less than 3 parts by weight does not achieve sufficient vulcanization adhesion property, while adding it by more than 20 parts by weight tends to cause rubber properties to drop.

Under the present invention, the synthetic rubber layer must have all of the five types of compounding ingredients mentioned above, and if any one of the four compounding ingredients other than organic peroxide used as vulcanizing agent is missing, the vulcanization-adhered laminate of fluororubber and synthetic rubber proposed by the present invention cannot be obtained.

In addition to the foregoing, any known compounding agent added to normal rubber compositions, such as, for example, carbon black, filler, softener, plasticizer, anti-aging agent, stabilizer, processing aid, can be added to the synthetic rubber layer as deemed appropriate.

[How to Manufacture Vulcanization-Adhered Laminate]

Methods to manufacture the vulcanization-adhered laminate proposed by the present invention include: a method whereby the fluororubber layer and synthetic rubber-containing layer are co-extruded prior to vulcanization and then crosslinked; a method whereby one rubber-containing layer is formed and then the other rubber-containing layer is formed while covering the first layer with the second layer at the same time, followed by crosslinking; a method whereby one rubber layer is crosslinked, after which the other rubber layer is laminated on top, followed by cross-linking of the other layer, or the like.

If a vulcanization-adhered laminate made according to the present invention is a hose, a method whereby a mandrel is covered with an unvulcanized laminate and the laminate is vulcanized can be adopted in addition to the aforementioned method.

[Applications of Vulcanization-Adhered Laminate]

The vulcanization-adhered laminate proposed by the present invention can be used for fuel hoses, hoses for transporting alcohol, oil or grease, etc., hoses for transferring air containing oil droplets, etc., hoses for transferring liquid or gas containing hydrocarbon such as mineral oil, LP gas, natural gas, or containers for storing the foregoing fluids, and further, mechanical parts, facility parts, building parts, and apparatus parts, such as industrial belts, buffers, vibration-damping materials, sheets, and boots, coming in contact with the foregoing fluids, and various other applications.

One example is a hose for transferring fuel, alcohol, LP gas, etc., wherein a fluororubber layer is formed on the interior surface of the hose that comes in contact with the transferred medium, while a synthetic rubber-containing layer is formed for the layer on the exterior of the hose. When the laminate is used other than as a hose, similarly a fluororubber layer is formed on the interior surface that comes in contact with fuel, alcohol, LP gas, etc., while a synthetic rubber-containing layer is formed for the other layer.

Figure 2:
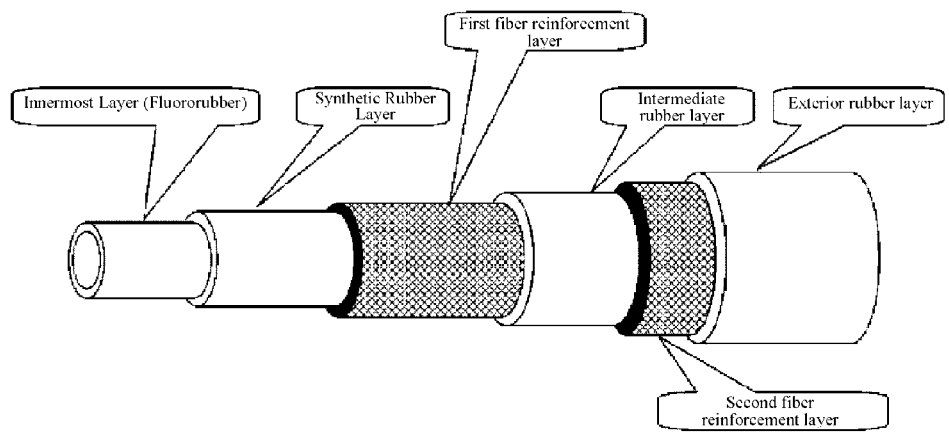
FIG. 2 Hose made of six layers, wherein the innermost layer uses fluororubber and is surrounded by, as outer layers, synthetic rubber, a first fiber reinforcement layer being a reinforcement layer, intermediate rubber layer, second fiber reinforcement layer being a reinforcement layer, and exterior rubber layer.

If the transferred fluid is of low pressure, for example, a hose consisting of two layers including a fluororubber layer constituting the inner layer and synthetic rubber layer constituting the outer layer is used, as shown in FIG. 1. If the transferred fluid is of high pressure, as shown in FIG. 2, a hose consisting of six layers can be used, where a fluororubber layer is used for the inner layer, a synthetic rubber layer is provided on the immediate exterior of the inner layer, and then a first fiber reinforcement layer, intermediate rubber layer, second fiber reinforcement layer and exterior rubber layer are provided sequentially toward the outer side. Needless to say, the present invention can also be used for hoses having other layer structures according to the applications.

Next, the present invention is explained in further detail, based on examples. It should be noted, however, that the present invention is not at all limited to these examples.

EXAMPLES AND COMPARATIVE EXAMPLES

The ingredients of the quantities shown in Tables 1 to 3 were compounded and kneaded using a kneader to obtain a NBR composition. A 8" roll was used to create a NBR sheet of 2 mm in thickness from this NBR composition.

A fluororubber sheet of 2 mm in thickness was also created in the same manner.

These sheets were measured for hardness in compliance with JIS K 6253, and tensile-tested using No. 3 Dumbbell according to JIS K 6251.

The unvulcanized NBR sheet of 2.0 mm in thickness, and unvulcanized fluororubber sheet of 2.0 mm in thickness, as obtained above, were pressed at 100° C. for 3 minutes as a pre-treatment, after which the pressed sheets were steam-vulcanized at 160° C. for 30 minutes to create a fluororubber-NBR laminate.

Adhered test pieces were peel-tested in compliance with JIS K 6256-1. A test piece was set on a tensile tester and pulled at a speed of 50 mm per minute to evaluate the adhesion property based on the condition of peeling of the adhesion interface of NBR and fluororubber.

x: Not adhered at all (poor adhesion). Pulling speed: 5 N/cm or below: NG

Δ: The interface peeled: NG

○: Rubber failed (good adhesion). Pulling strength: 25 N/cm or above: OK

TABLE 1

| | | Example 1 | Example 2 | Example 3 |
|---|---|---|---|---|
| NBR blend | NBR | 100 | 100 | 100 |
| | Zinc oxide | 3 | 3 | 3 |
| | Stearic acid | 1 | 1 | 1 |
| | Carbon black | 40 | 40 | 40 |
| | Organic peroxide | 1 | 0.5 | 10 |
| | Silica | 20 | 5 | 35 |
| | Magnesium oxide | 10 | 3 | 20 |
| | Maleic anhydride-modified polybutadiene | 5 | 1 | 20 |
| | Organic phosphonium salt | 2 | 0.5 | 5 |
| Properties | Total | 182 | 154 | 234 |
| | Normal properties | | | |
| | Hardness | 83 | 72 | 89 |
| | Tensile strength (MPa) | 21.3 | 21 | 22.6 |
| | Elongation (%) | 220 | 370 | 200 |
| | Adhesion property of NBR and fluororubber — Judgment | ○ | ○ | ○ |
| | Adhesion property of NBR and fluororubber — Strength | NBR failed at 25 N/cm or above | NBR failed at 25 N/cm or above | NBR failed at 25 N/cm or above |

TABLE 2

| | | Comparative Example 1 | Comparative Example 2 | Comparative Example 3 | Comparative Example 4 |
|---|---|---|---|---|---|
| NBR blend | NBR | 100 | 100 | 100 | 100 |
| | Zinc oxide | 3 | 3 | 3 | 3 |
| | Stearic acid | 1 | 1 | 1 | 1 |
| | Carbon black | 40 | 40 | 40 | 40 |
| | Organic peroxide | 1 | 1 | 1 | 1 |
| | Silica | 20 | | | |
| | Magnesium oxide | 10 | | | |
| | Maleic anhydride-modified polybutadiene | | | 5 | |
| | Organic phosphonium salt | | | | 2 |
| Properties | Total | 165 | 155 | 150 | 147 |
| | Normal properties | | | | |
| | Hardness | 78 | 73 | 74 | 72 |
| | Tensile strength (MPa) | 19.9 | 20.1 | 18.4 | 15 |
| | Elongation (%) | 240 | 260 | 270 | 210 |
| | Adhesion property of NBR and fluororubber — Judgment | x | x | x | x |
| | Adhesion property of NBR and fluororubber — Strength | 0.4 N/cm | 0.3 N/cm | 0.2 N/cm | 3.8 N/cm |

TABLE 3

| | | Comparative Example 5 | Comparative Example 6 | Comparative Example 7 | Comparative Example 8 |
|---|---|---|---|---|---|
| NBR blend | NBR | 100 | 100 | 100 | 100 |
| | Zinc oxide | 3 | 3 | 3 | 3 |
| | Stearic acid | 1 | 1 | 1 | 1 |
| | Carbon black | 40 | 40 | 40 | 40 |
| | Organic peroxide | 1 | 1 | 1 | 1 |
| | Silica | | 20 | 20 | 20 |
| | Magnesium oxide | 10 | | 10 | 10 |
| | Maleic anhydride-modified polybutadiene | 5 | 5 | | 5 |
| | Organic phosphonium salt | 2 | 2 | 2 | |
| Properties | Total | 162 | 172 | 177 | 180 |
| | Normal properties | | | | |
| | Hardness | 78 | 78 | 79 | 82 |
| | Tensile strength (MPa) | 19.1 | 18.2 | 19.8 | 21.5 |
| | Elongation (%) | 230 | 220 | 230 | 230 |
| | Adhesion property of NBR and fluororubber — Judgment | Δ | Δ | Δ | Δ |
| | Adhesion property of NBR and fluororubber — Strength | 15.4 N/cm | 16.1 N/cm | 12.3 N/cm | 8.9 N/cm |

NBR: Nancar 1053 by Nantex
Carbon black: Asahi #60G by Asahi Carbon
Organic peroxide: Perbutyl P by NOF
Silica: Hi-Sil 233 by PPG Industries
Magnesium oxide: Kyowa Mag 150 by Kyowa Chemical Industry
Maleic anhydride-modified polybutadiene: RicoBond 1756 by Sartomer
Organic phosphonium salt: Zeonet PB by Nippon Chemical Industries
Fluororubber: DM-EL G558 by Daikin Industry According to the results of the above examples and comparative examples, vulcanization-adhered laminates according to the present invention demonstrated excellent adhesion property between the two layers, but for example, when only one of ingredients (2) to (5) specified by the present invention was used, as shown in Comparative Examples 1 to 4, the two layers did not adhere at all. When at least one of ingredients (2) to (5) specified by the present invention was missing on the other hand, as shown in Comparative Examples 5 to 8, the interface of the two layers peeled.

According to these examples and comparative examples, the synthetic rubber layer must contain all of the above five types of compounding ingredients and if any one of the four ingredients other than organic peroxide used as vulcanizing agent is missing, the vulcanization-adhered laminate proposed by the present invention, where the fluororubber layer and synthetic rubber are adhered fully, cannot be obtained. The present invention demonstrates significant effects only when the synthetic rubber-containing layer to be vulcanization-adhered with the fluororubber layer contains all of ingredients (1) to (5), and it is clear that the effects of the present invention are not due to simple combination of the effects of individual ingredients (2) to (5) used separately with (1).

Furthermore, unlike the prior arts, the synthetic rubber layer does not have DBU, DBN, etc., blended in it. This eliminates the possibility of uncontrolled vulcanization in the synthetic rubber-containing layer in the stage before the vulcanization process, resulting in progression of scorching and consequent poor adhesion with the fluororubber layer in the subsequent vulcanization process.

What is claimed is:

1. A vulcanization-adhered laminate comprising a fluororubber layer which is vulcanization-adhered and in contact with a layer constituted by a synthetic rubber which is acrylonitrile-butadiene rubber (NBR), wherein the layer constituted by the acrylonitrilebutadiene rubber consists of, before vulcanization adhesion, NBR, components (1) to (5) below for vulcanization adhesion reaction, and at least one compounding agent selected from the group consisting of carbon black, filler, softener, plasticizer, anti-aging agent, stabilizer, and processing aid:
   (1) Organic peroxide, 0.5 to 10 parts by weight,
   (2) Silica, 5 to 35 parts by weight,
   (3) Organic phosphonium salt, 0.5 to 5 parts by weight,
   (4) Maleic anhydride-modified polybutadiene, 1 to 20 parts by weight, and
   (5) Magnesium oxide, 3 to 20 parts by weight, wherein all the above parts by weight are relative to 100 parts by weight of the acrylonitrilebutadiene rubber.

2. A flexible vehicle hose whose cross-section is constituted by at least multiple layers, wherein said flexible hose for vehicles is characterized by being constituted by the vulcanization-adhered laminate of claim 1 wherein the interior rubber layer is made of the fluororubber layer, and the layer constituted by the acrylonitrilebutadiene rubber is provided on the outside of the interior rubber layer.

3. The flexible hose for vehicles according to claim 2, having the interior rubber layer and the layer constituted by the acrylonitrilebutadiene rubber provided on the outside of the interior rubber layer, wherein at least one fiber reinforcement layer is provided on the outside of the layer constituted by the acrylonitrile-butadiene rubber, and an exterior rubber layer is provided on the outside of this fiber reinforcement layer.

4. The vulcanization-adhered laminate according to claim 1, wherein the layer constituted by the acrylonitrile-butadiene rubber is free of 1,8-diazabicyclo[5.4.0]undec-7-ene (DBU), DBU salt, 1,5-diazabicyclo[4.3.0]non-5-ene (DBN), and DBN salt.

* * * * *